J. S. MULLENNIX.
FILTER.
APPLICATION FILED OCT. 16, 1911.
1,038,417.
Patented Sept. 10, 1912.
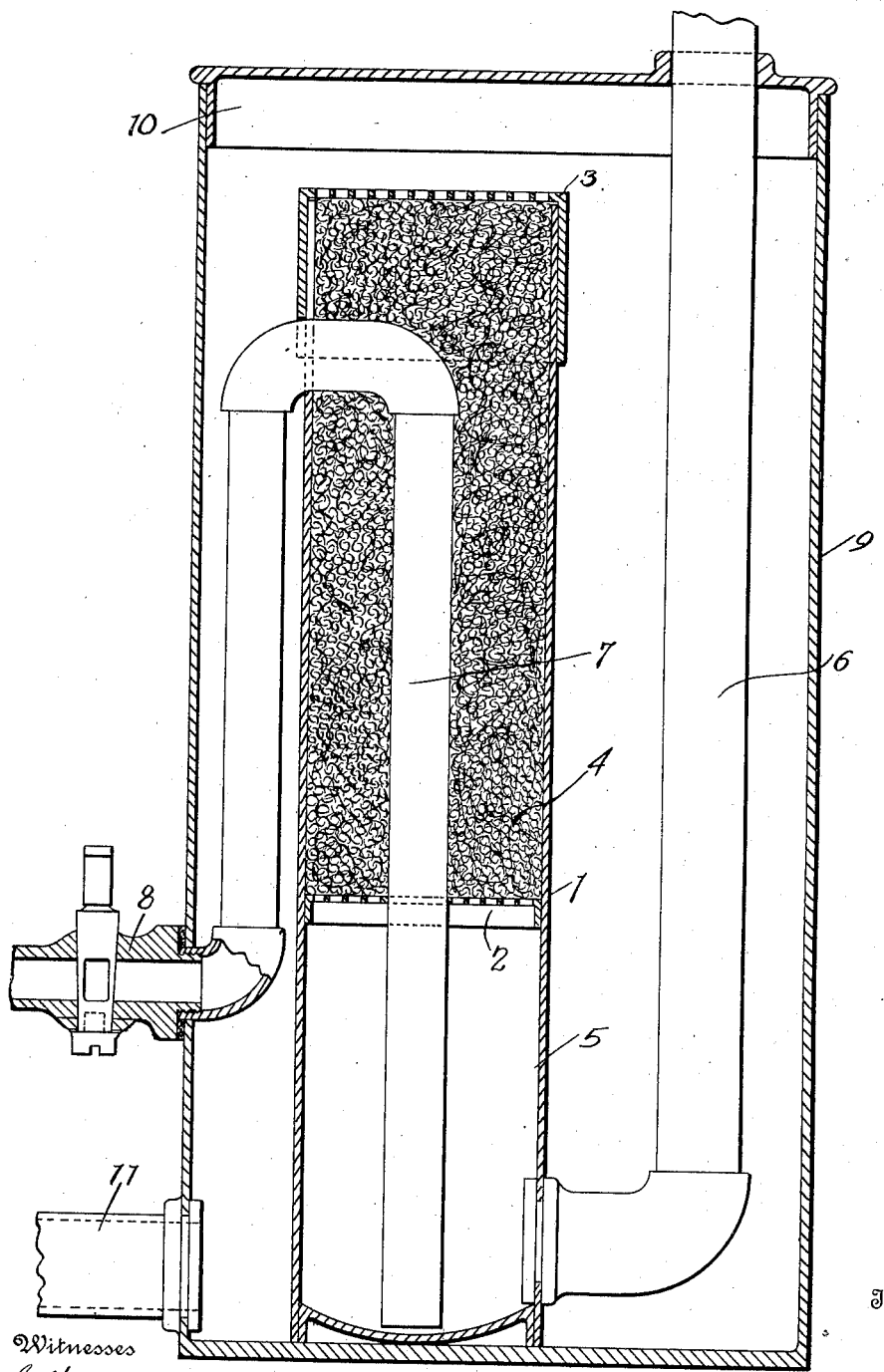
Witnesses
G. Howard Walmsley.
Harriet L. Hammaker.
Inventor
John S. Mullennix,
By Toulmin & Reed.
Attorneys

UNITED STATES PATENT OFFICE.

JOHN S. MULLENNIX, OF BRADFORD, OHIO.

FILTER.

1,038,417. Specification of Letters Patent. Patented Sept. 10, 1912.

Application filed October 16, 1911. Serial No. 654,871.

*To all whom it may concern:*

Be it known that I, JOHN S. MULLENNIX, a citizen of the United States, residing at Bradford, in the county of Miami and State of Ohio, have invented certain new and useful Improvements in Filters, of which the following is a specification, reference being had therein to the accompanying drawing.

This invention relates to filters and is designed more particularly for use with a down pipe leading to a cistern.

The object of the invention is to provide a filter which will effectually separate dirty water from the clear; which will not clog; and which can be produced at a low cost.

The accompanying drawing is a section taken vertically through a filter embodying my invention.

In this drawing I have illustrated one embodiment of the invention and have shown the same as comprising a casing 1 divided at a point between its ends by a foraminated partition 2 and closed at its upper end by means of a cap 3 which is also perforated to permit the escape of water. The space between the partitions 2 and 3 is filled with suitable filtering material, such as sponge, as indicated at 4. That portion of the casing 1 between the lower partition 2 and the bottom of the casing constitutes a water chamber, as indicated at 5, to which is connected a supply pipe 6 which, when the invention is applied to the inlet pipe of a cistern, will be connected with the down-spout leading from the roof. The supply pipe is here shown as connected with the casing at a point near the bottom thereof, the bottom being cup shaped to form a shallow well below the level of the inlet opening. As the water enters the chamber 5 it will pass upward through the filtering material and escape from the upper end of the casing. Any impurities or solid matter contained within the water will be separated therefrom by the filtering material and the larger portion of this matter will remain in the chamber 5. To remove this accumulation of matter from the chamber 5 and prevent the clogging of the filter I provide an outlet pipe which is preferably in the form of a siphon which is indicated at 7. One arm of the siphon communicates with the chamber 5, preferably near the bottom of the well formed therein and below the level of the inlet opening. In the present arrangement of the siphon that arm thereof which communicates with the chamber 5 extends upward through the partition 2 and filtering material 4 to a point near the upper end of the casing where it is provided with an elbow which extends through the side of the casing and connects with the other arm of the siphon which, in turn, is connected with the waste pipe. If desired, the other arm of the siphon may be provided with a cut-off, as indicated at 8, to avoid waste of water after the roof has been thoroughly washed and little or no foreign matter is being separated from the water by the filter. The clear water which passes from the upper end of the casing may be taken care of in any suitable manner. Preferably, the casing 1 is mounted within a suitably receptacle or outer casing 9, the upper end of which is closed by a cap 10 and which communicates with an outlet pipe 11. The supply pipe 6 enters through the cap 10 and the outer arm of the siphon extends through the side wall of this outer casing. Obviously, this outer casing may be of any suitable character, preferably, a shallow concrete well or a sewer pipe sunk in the ground.

In the operation of the device the water enters the chamber 5 from the supply pipe, rises through the filtering material in the upper part of the casing 1 and escapes through the cap 3 into the outer casing 9 from which it escapes through the outlet pipe 11. The impurities separated from the water are, as above stated, accumulated in the chamber 5. The water will, of course, rise in the inner arm of the siphon 7 as it rises in the casing 1, and, when the level of the water rises above the elbow of the siphon the operation of the latter will be automatically started and the impurities which have been accumulated in the bottom of the chamber 5 will be drawn through the siphon with the water which passes through the same.

A filter thus constructed is found to be highly efficient in operation and can be manufactured at a low cost. Further, it is of such a character that it will not get out of order or become clogged. At the worst it will only be necessary to renew the filtering material in the casing 1.

While I have shown and described one embodiment of my invention it will be understood that this is chosen for the purpose of illustration only and that I do not desire to be limited to the details of construction shown and described, for obvious modifications will occur to a person skilled in the art.

Having thus fully described my invention, what I claim as new and desire to secure by Letters Patent, is:—

1. A filter comprising a casing having an unobstructed portion for the reception of filtering material and having an inlet opening, an outlet opening and a chamber between said openings, a supply pipe communicating with said inlet opening, a perforated plate between said openings, a removable perforated plate extending across the outlet opening and provided with a depending flange for surrounding the upper portion of said casing, filtering material in said unobstructed portion of said casing and between said plates, an outer casing surrounding said first mentioned casing having an outlet near its bottom, a siphon communicating with said chamber and extending above the top of said chamber and then out through a wall of each of said casings, the inlet of said siphon being located near the bottom of said chamber.

2. A filter comprising a casing having its top provided with a perforated cap to form an outlet opening, its bottom cup shaped to form a well, a chamber above said well, and an opening near said well through which said chamber communicates with a supply pipe, a perforated plate between said chamber and said perforated cap, filtering material between said perforated plate and cap, an outer casing surrounding said first mentioned casing having an outlet opening near its bottom, and a cap for closing its upper end, said cap having an opening through which the supply pipe passes, and a siphon passing through said chamber, a portion of the filtering material, then through a wall of each of said casings, the end of said siphon within the filter lying within said well.

In testimony whereof, I affix my signature in presence of two witnesses.

JOHN S. MULLENNIX.

Witnesses:
MARY M. SPITLER,
J. H. SPITLER.

---

Copies of this patent may be obtained for five cents each, by addressing the "Commissioner of Patents, Washington, D. C."